United States Patent
Negishi et al.

(10) Patent No.: US 7,806,712 B2
(45) Date of Patent: Oct. 5, 2010

(54) ELECTRIC COMPRESSOR

(75) Inventors: Yasutaka Negishi, Takasaki (JP); Masahiro Matsushima, Isesaki (JP)

(73) Assignee: Sanden Corporation, Iseaki-shi, Gunma (JP)

( * ) Notice: Subject to any disclaimer, the term of this patent is extended or adjusted under 35 U.S.C. 154(b) by 86 days.

(21) Appl. No.: 12/159,975

(22) PCT Filed: Dec. 27, 2006

(86) PCT No.: PCT/JP2006/326010
§ 371 (c)(1),
(2), (4) Date: Jul. 2, 2008

(87) PCT Pub. No.: WO2007/077857
PCT Pub. Date: Jul. 12, 2007

(65) Prior Publication Data
US 2009/0269955 A1 Oct. 29, 2009

(30) Foreign Application Priority Data
Jan. 5, 2006 (JP) ............................. 2006-000939

(51) Int. Cl.
*H01R 13/52* (2006.01)
(52) U.S. Cl. .................................... 439/281
(58) Field of Classification Search ................. 439/271, 439/589, 911; 310/71
See application file for complete search history.

(56) References Cited
U.S. PATENT DOCUMENTS
5,515,217 A * 5/1996 Higashikata et al. .......... 361/22

6,779,989 B2 * 8/2004 Makino et al. ........... 417/410.1
7,197,892 B2 * 4/2007 Ioi et al. ........................ 62/508
7,281,910 B2 * 10/2007 Hasegawa ................ 417/410.5

FOREIGN PATENT DOCUMENTS

| JP | H07-241061 A | 9/1995 |
| JP | H08-219060 A | 8/1996 |
| JP | 2005-023934 A | 1/2005 |

OTHER PUBLICATIONS

Japanese Patent Office; International Search Report for Japanese Patent Application No. PCT/JP2006/326010 (counterpart to the above-captioned U.S. patent application) mailed Mar. 6, 2007.

* cited by examiner

*Primary Examiner*—Phuong K Dinh
(74) *Attorney, Agent, or Firm*—Baker Botts L.L.P.

(57) ABSTRACT

An electric compressor having a compression mechanism, an electric motor for driving the compression mechanism, and a housing for containing the compression mechanism and the electric motor. An opening formed in the housing is closed with a lid member to which a sealed terminal is attached, and an electroconductive pin of the sealed terminal is fitted into a socket connected to a lead wire of the electric motor. The socket is embedded in an insulative member, and the electroconductive pin of the sealed terminal is inserted into a hole formed in the insulative member and is fitted into the socket. An insulation section that surrounds the base portion of the electroconductive pin and the insulative member hold a ring member that is formed from an insulative elastic material and surrounds the electroconductive pin, and this portion held is sealed and insulated by elastic deformation of the ring member. Injection and curing of resin for insulation, which have been carried out for a conventional structure, are not necessary, so that the electric compressor has high assembling efficiency and whose sealed terminal can be reused.

5 Claims, 2 Drawing Sheets

ELECTRIC COMPRESSOR

CROSS-REFERENCE TO RELATED APPLICATIONS

This application is the National Stage of International Patent Application No. PCT/JP2006/326010, filed Dec. 27, 2006, which claims the benefit of Japanese Patent Application No. 2006-000939, filed Jan. 5, 2006, the disclosures of which are incorporated herein by reference in their entirety.

TECHNICAL FIELD OF THE INVENTION

The present invention relates to an electric compressor, and specifically, to improvement of an insulation structure of an electric connection section for supplying electric power to an electric motor.

BACKGROUND ART OF THE INVENTION

An electric compressor is disclosed in Patent document 1, etc., which has a compression mechanism, an electric motor for driving the compression mechanism and a housing for containing the compression mechanism and the electric motor and wherein an opening formed in the housing is closed with a lid member to which a sealed terminal is attached, and an electroconductive pin of the sealed terminal is fitted into a socket connected to an end section of a lead wire of the electric motor. In the electric compressor disclosed in Patent document 1, etc., in order to insulate the connection section between the electroconductive pin and the socket, generally, after both parts are connected, an insulative resin is injected into the housing and the connection section is secured with the insulative resin.

However, in such an electric compressor in which the connection section between the electroconductive pin of the sealed terminal and the socket is secured with the insulative resin injected into the housing, there occurs a waiting time for curing the insulative resin injected into the housing, and there are a problem that the assembling efficiency for the compressor is reduced, a problem that the sealed terminal is secured with the resin and cannot be reused, etc.

Patent document 1: JP-A-7-247959

DISCLOSURE OF THE INVENTION

Problems to be Solved by the Invention

Accordingly, an object of the present invention is to provide an electric compressor in which the assembling efficiency is higher than that of the conventional structure and the sealed terminal can be reused.

Means for Solving the Problems

To achieve the above-described object, an electric compressor according to the present invention provides has a compression mechanism, an electric motor for driving the compression mechanism, and a housing for containing the compression mechanism and the electric motor, wherein an opening formed in the housing is closed with a lid member to which a sealed terminal is attached, and an electroconductive pin of the sealed terminal is fitted into a socket connected to an end section of a lead wire of the electric motor, and is characterized in that the socket is embedded in an insulative member, the electroconductive pin of the sealed terminal is inserted into a hole formed in the insulative member and is fitted into the socket, and an insulation section that surrounds a base portion of the electroconductive pin and the insulative member hold a ring member which is formed from an insulative elastic material and surrounds the electroconductive pin.

By this structure, the connection section between the electroconductive pin and the socket is insulated without injecting an insulative resin into the housing. Namely, by embedding the socket in the insulative member, inserting the electroconductive pin of the sealed terminal into the hole formed in the insulative member and fitting the pin into the socket, and holding the ring member formed from an insulative elastic material and surrounding the electroconductive pin with the insulation section that surrounds the base portion of the electroconductive pin and the insulative member, the connection section between the electroconductive pin and the socket is insulated. Since an insulative resin is not injected into the housing, a time required for curing the resin does not occur, and the assembling efficiency is not reduced. Further, because the sealed terminal is not secured with a resin, it can be reused.

In a preferred embodiment, the ring member is elastically deformed by a pressing force applied from the insulation section and the insulative member, and the ring member elastically deformed seals an annular gap between the insulation section and the insulative member.

The sealed terminal may be either a glass sealed terminal or a sealed terminal using an insulation material other than glass. For example, the insulation section surrounding the base portion of the electroconductive pin is made from a glass or an insulative resin.

Such an electric compressor according to the present invention is suitable, for example, as a compressor provided in a refrigeration circuit of an air conditioning system, specifically, as a compressor provided in a refrigeration circuit of an air conditioning system for a vehicle for which a high insulation property is required.

Effect According to the Invention

Thus, in the electric compressor according to the present invention, because injection of resin into the housing and the time for curing the injected resin are not necessary as compared with the conventional structure, the assembling efficiency is very high. Further, because resin injection is not necessary, it becomes possible to reuse the sealed terminal.

EXPLANATION OF SYMBOLS

Figure 1:
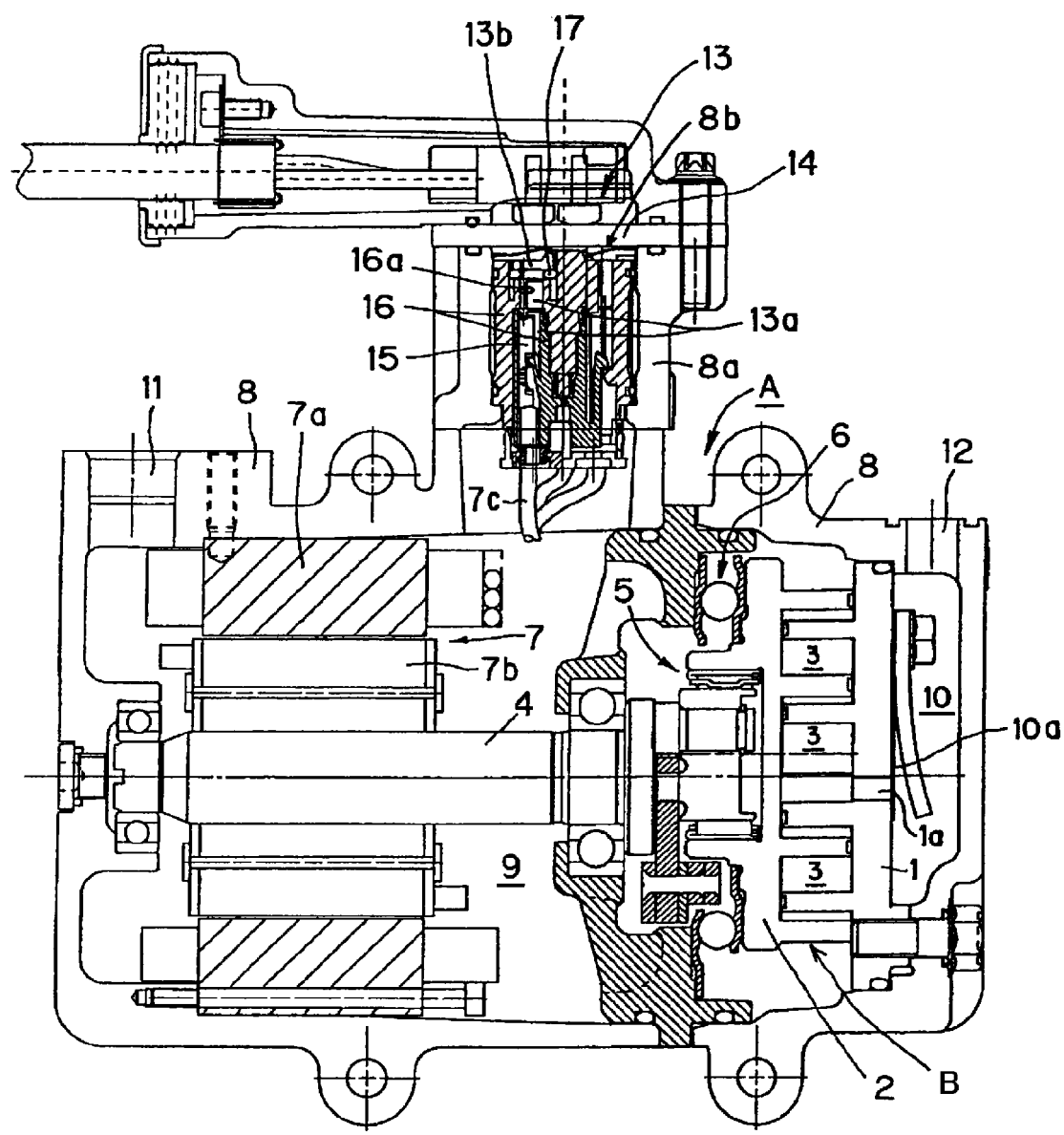
FIG. 1 is a vertical sectional view of an electric compressor according to an embodiment of the present invention.

1: fixed scroll
2: movable scroll
3: operational space
4: main shaft
7: electric motor
7a: stator
7b: rotor
7c: lead wire
8: housing
8a: cylindrical projected portion
8b: opening
9: suction chamber
10: discharge chamber
11 suction port
12: discharge port
13: sealed terminal 13a: electroconductive pin
13b: insulation section
14: lid member
15: socket
16: resin member as insulative member
16a: hole
17: ring member
A: electric compressor
B: compression mechanism

THE BEST MODE FOR CARRYING OUT THE INVENTION

Hereinafter, a desirable embodiment of the present invention will be explained referring to figures.

FIG. 1 depicts an electric compressor according to an embodiment of the present invention, and in this embodiment, it is structured as a scroll-type electric compressor A. Scroll type compressor A has a fixed scroll 1 comprising an end plate formed with a discharge hole la in its center and a spiral body, and a movable scroll 2 comprising an end plate and a spiral body. The spiral body of fixed scroll 1 and the spiral body of movable scroll 2 engage with each other, and form a plurality of pairs of operational spaces 3. A main shaft 4, a movement transforming mechanism 5 for transforming the rotational movement of main shaft 4 to an orbital movement and transmitting the orbital movement to movable scroll 2, and a rotation preventing mechanism 6 for preventing the rotation of movable scroll 2 are disposed in the compressor. A compression mechanism B is formed by these fixed scroll 1, movable scroll 2, main shaft 4, movement transforming mechanism 5 and rotation preventing mechanism 6.

An electric motor 7 formed by a stator 7a and a rotor 7b is provided in order to drive main shaft 7 and drive compression mechanism B. Compression mechanism B and electric motor 7 are contained in a housing 8. The inside space of housing 8 is partitioned into a suction chamber 9 and a discharge chamber 10 with the boundary formed by the end plate of fixed scroll 1. Compression mechanism B and electric motor 7 are disposed in suction chamber 9. A suction port 11 is formed at a position forming a surrounding wall of suction chamber 9 of housing 8, and a discharge port 12 is formed at a position forming a surrounding wall of discharge chamber 10. For example, suction port 11 is connected to a low-pressure side circuit in a refrigeration circuit of an air conditioning system, and discharge port 12 is a high-pressure side circuit.

Figure 2:
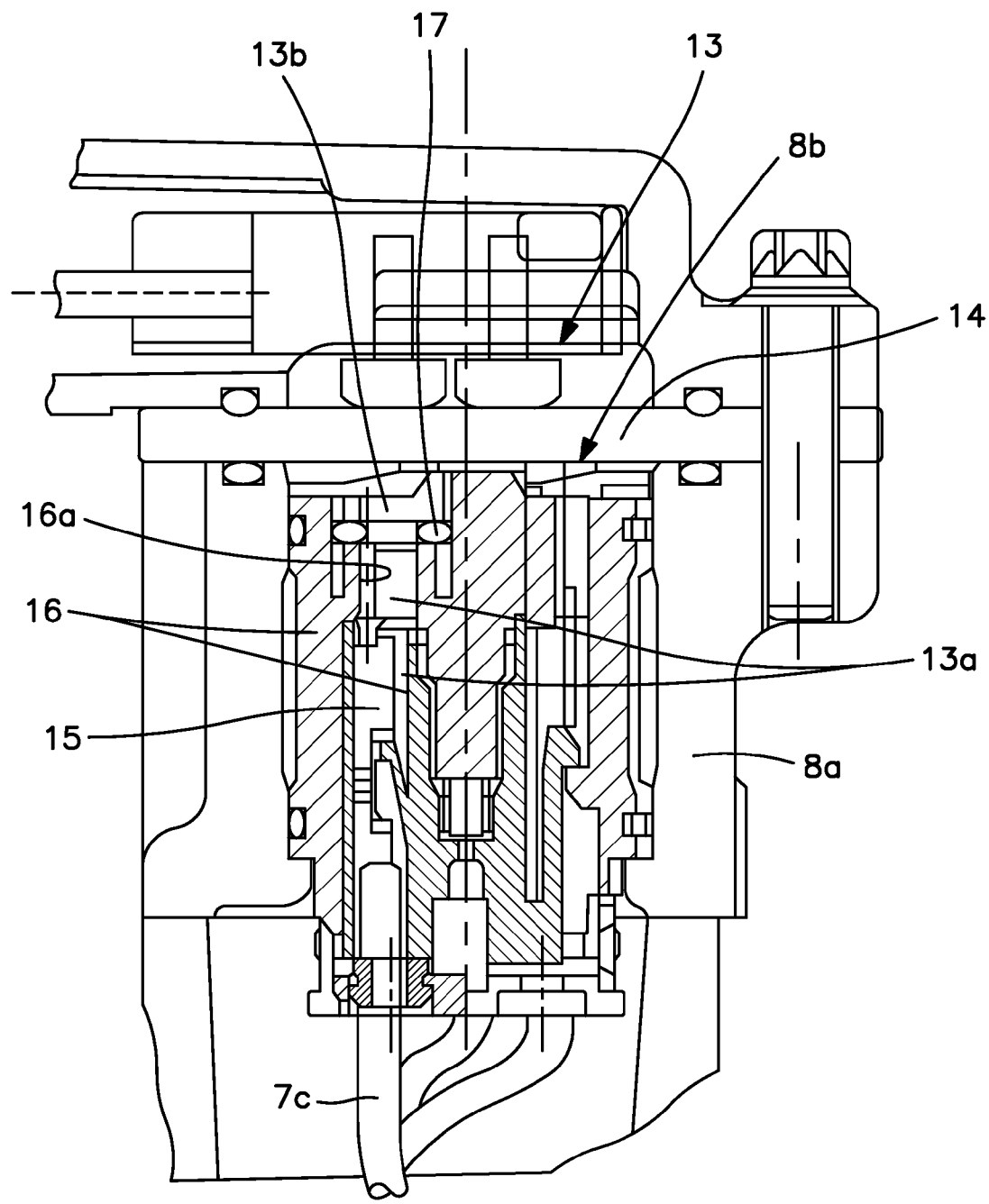
FIG. 2 is an enlarged view of a portion of the electrical compressor shown in FIG. 1.

As shown in FIGS. 1 and 2, a lid member 14 attached with a sealed terminal 13 connected to a power source (not shown) is fixed to the tip of a cylindrical projected portion 8a of housing 8, and it closes an opening 8b formed on the tip of the cylindrical projected portion 8a. A socket 15 is connected to the end portion of each lead wire 7c of electric motor 7, and socket 15 is embedded in a resin member 16 provided as an insulative member. An electroconductive pin 13a of sealed terminal 13 is inserted into a hole 16a formed in the insulative resin member 16 and fitted into socket 15. The base portion of electroconductive pin 13a is surrounded by an insulation section 13b made from a material such as a glass or an insulative resin. Insulation section 13b and insulative resin member 16 hold a ring member 17 comprising an insulative elastic material which surrounds electroconductive pin 13a. The annular space formed between insulative resin member 16 surrounding electroconductive pin 13a and insulation section 13b is sealed by ring member 17, which is applied with a pressing force from insulation section 13b and insulative resin member 16 and deformed.

In electric compressor A according to this embodiment, main shaft 4 is driven and rotated by electric motor 7. The rotation of main shaft 4 is transformed into an orbital movement through movement transforming mechanism 5, and transmitted to movable scroll 2. The rotation of movable scroll 2 is prevented by rotation preventing mechanism 6. By the orbital movement of movable scroll 2, refrigerant gas flowing into suction chamber 9 from a low-pressure side circuit of an air conditioning system through suction port 11 is taken into a pair of operational spaces 3 from the radially outer side of the spiral body. The pair of operational spaces 3 is moved toward the central portion of the spiral body while their volumes are decreased, and finally they are mutually communicated and they communicate with discharge hole 1a. The refrigerant gas compressed in operational spaces 3 is discharged into discharge chamber 10 through a discharge valve 10a for opening and closing discharge hole la, and the refrigerant passes through discharge port 12 and flows out to a high-pressure side circuit of the air conditioning system.

In electric compressor A according to this embodiment, by embedding socket 15 in insulative resin member 16, inserting electroconductive pin 13a of sealed terminal 13 into hole 16a formed in insulative resin member 16 and fitting it into socket 15, and holding ring member 17 surrounding electroconductive pin 13a and made from an insulative elastic material with insulation section 13b surrounding the base portion of electroconductive pin 13a and insulative resin member 16, ring member is elastically deformed, and the annular gap formed between insulative resin member 16 and insulation section 13b is sealed, thereby insulating the connection section between electroconductive pin 13a and socket 15. Since it is not necessary to inject an insulative resin into housing 8 and a time required for curing the resin does not occur, the assembling efficiency of electric compressor A is not reduced. Further, because sealed terminal 13 is not secured with resin, it can be reused.

Thus, by such a simple improvement, an excellent assembling efficiency of electric compressor A can be achieved while a good insulation property can be ensured, and it also becomes possible to reuse sealed terminal 13.

Where, although scroll-type compressor A has been explained in the above-described embodiment, the present invention is not limited thereto, and can be also applied to another type electric compressor, for example, a piston-type electric compressor, etc.

INDUSTRIAL APPLICATIONS OF THE INVENTION

The present invention can be applied broadly to any electric compressor.

The invention claimed is:

1. An electric compressor having a compression mechanism, an electric motor for driving said compression mechanism, and a housing for containing said compression mechanism and said electric motor, wherein an opening formed in said housing is closed with a lid member to which a sealed terminal is attached, and an electroconductive pin of said sealed terminal is fitted into a socket connected to an end section of a lead wire of said electric motor, characterized in that said socket is embedded in an insulative member, said electroconductive pin of said sealed terminal is inserted into a hole formed in said insulative member and is fitted into said socket, and an insulation section that surrounds a base portion of said electroconductive pin and said insulative member hold a ring member which is formed from an insulative elastic material and surrounds said electroconductive pin.

2. The electric compressor according to claim 1, wherein said ring member is elastically deformed by a pressing force applied from said insulation section and said insulative member.

3. The electric compressor according to claim 2, wherein said ring member elastically deformed seals an annular gap between said insulation section and said insulative member.

4. The electric compressor according to claim 1, wherein said insulation section is made from a glass or an insulative resin.

5. The electric compressor according to claim 1, wherein said electric compressor is a compressor provided in a refrigeration circuit of an air conditioning system.

* * * * *